United States Patent [19]

Schoenberger

[11] Patent Number: 4,885,093
[45] Date of Patent: Dec. 5, 1989

[54] METHOD FOR PURIFICATION OF PHOSPHATE-CONTAINING SEWAGE

[75] Inventor: Rainer Schoenberger, Munich, Fed. Rep. of Germany

[73] Assignee: Linde Aktiengesellschaft, Wiesbaden, Fed. Rep. of Germany

[21] Appl. No.: 139,535

[22] Filed: Dec. 30, 1987

[30] Foreign Application Priority Data

Dec. 30, 1986 [DE] Fed. Rep. of Germany ....... 3644770

[51] Int. Cl.$^4$ .............................................. C02F 3/30
[52] U.S. Cl. ..................................... 210/605; 210/625; 210/630; 210/906
[58] Field of Search ............... 210/605, 607, 609, 614, 210/621–626, 630, 631, 903, 906

[56] References Cited

U.S. PATENT DOCUMENTS

| Re. 32,429 | 6/1987 | Spector | 210/605 |
| 3,654,147 | 4/1972 | Levin et al. | 210/906 X |
| 4,141,822 | 2/1979 | Levin et al. | 210/906 X |
| 4,488,968 | 12/1984 | Hong et al. | 210/906 X |
| 4,650,585 | 3/1987 | Hong et al. | 210/605 |

OTHER PUBLICATIONS

Krichten, D. J., Hong, S. N., Tracy, K. D., Applied Biological Phosphorus Removal by the A/O Process, Internat. Conf. "Phosphorus in the Environment," Lisbon, Jul. 1985.

Ekama, G. A., Marais, G. R., Additional Biological P Elimination in the Activated Sludge Process—Experiences in South Africa, GWF 126, pp. 214 to 249 (1985) (no translation).

Levin, G. V., Topol, G. J., Tarnay, A. G., Operation of Full Scale Biological Phosphorus Removal Plant, JWPCF 47, 577–590 (1975).

*Primary Examiner*—Tom Wyse
*Attorney, Agent, or Firm*—Millen, White & Zelano

[57] ABSTRACT

For improvement of the phosphate redissolution taking place under anaerobic conditions, the treatment is conducted under anaerobic conditions, preferably in a settling tank, into which unsettled raw sewage and a return sludge from the secondary settling tank are introduced. The sludge retention time of the return sludge is generally over 5 hours, preferably 10–24 hours. In any case, the sludge detection time exceeds the hydraulic detection time.

The new process can be performed by using most existing plants with relative small investment expenditures and provides a phosphorus elimination on the order of magnitude of 90%.

14 Claims, 7 Drawing Sheets

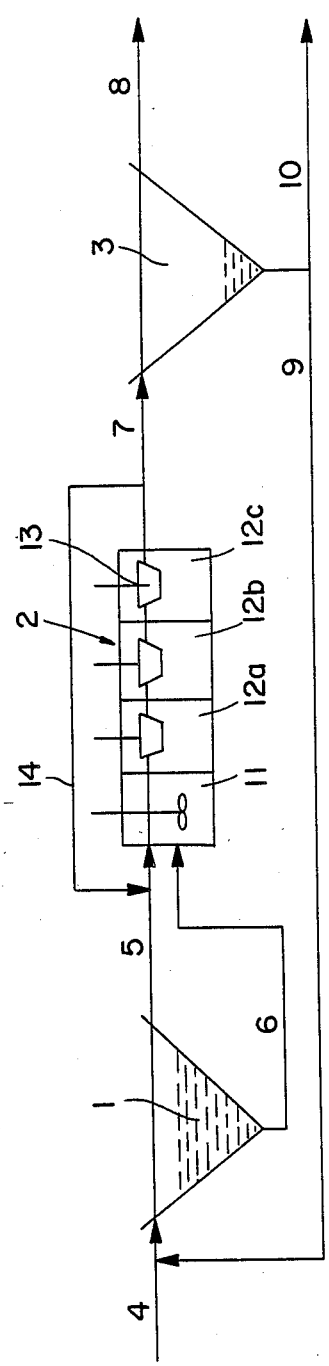
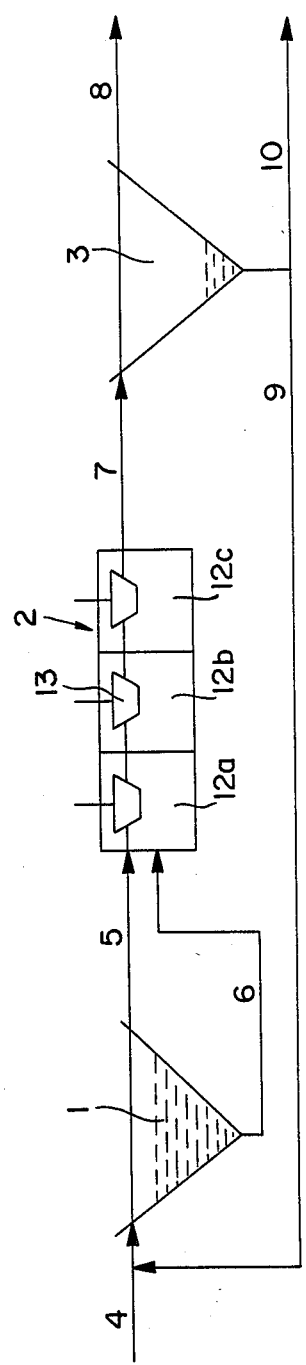
FIG. 7
FIG. 8

METHOD FOR PURIFICATION OF PHOSPHATE-CONTAINING SEWAGE

BACKGROUND OF THE INVENTION

This invention relates to a process and apparatus for purification of phosphate-containing sewage with biological phosphorus elimination, in which the settleable and/or nonsettleable sewage components are treated with activated sludge in successive treatment tanks, first under anaerobic and then under aerobic conditions, and in which return activated sludge is passed from the secondary settling tank into the stage operating under anaerobic conditions.

Unlike nitrogen compounds, phosphorus compounds can be removed from sewage only if they can be separated from the sewage in the solid state on the basis of chemical or biochemical reactions. The previously required conversion of phosphates from the water to the solid state in this case can take place only by incorporation into the biomass or by chemical precipitation.

For many years chemical precipitation processes have been used in a multiplicity of settling plants for elimination of phosphorus. Processes, in which the phosphorus elimination takes place in a biological or biological-chemical manner, represent a comparatively recent development. Thus, in the purely biological process an effort is made to fix biologically in excess sludge the entire phosphorus that is to be eliminated. On the other hand, in the biological-chemical process the biological effect is combined in a special technique with an exceptionally economically operating lime precipitation.

In the biological process, use is made of the phenomenon that the phosphorus contained in the sewage is released or bound by certain microorganisms depending on the conditions under which sewage and activated sludge are in contact. In this case the phosphorus is present in the sewage practically exclusively as phosphate, namely mostly as dissolved phosphate and in a considerably smaller amount as bound, particulate phosphate. If in a biological settling plant operating according to the activated sludge process, the activated sludge is subjected to a constant change from anaerobic conditions (absence of dissolved oxygen, nitrite and nitrate) and aerobic conditions (presence of dissolved oxygen), it becomes apparent that the activated sludge under anaerobic conditions releases phosphate and the activated sludge under aerobic conditions absorbs phosphate. Thus there occurs the phosphate release in the anaerobic phase in contrast to a phosphate absorption in the aerobic phase. In this connection, it has been shown in all the studies conducted in this field that the degree of phosphate absorption under aerobic conditions is directly related to the degree of previous phosphate redissolution in the anaerobic phase.

The fact that the extent of the phosphate absorption is always higher than the extent of previous redissolution is essential for a biological phosphorus elimination. Since the separation of purified sewage from the biological sludge takes place following the aerobic phase, a net elimination remains, i.e., a lowered phosphorus concentration in the discharge and an increased phosphorus concentration in the excess sludge of the settling plant.

Therefore to increase the elimination performance an effort is made to produce as high as possible an amount of excess sludge and/or to permit the phosphorus content in the excess sludge to rise to as high a value as possible.

The specific excess sludge production is thus determined by the sludge loading.

The phosphorus content of the excess sludge can be increased on the basis of the above-mentioned relationships, namely by an intensification of the phosphorus redissolution and the subsequent intensified phosphorus absorption resulting from it.

If it is desired to influence the phosphorus elimination by changing the phosphorus redissolution/phosphorus absorption in a biological settling plant, as other conditions there must be further considered:

1. The presence of nitrite and nitrate prevents phosphorus redissolution. Thus, no nitrite- or nitrate-containing partial streams should flow into the anaerobic part of the plant.

2. The availability of an easily degradable substrate accelerates the phosphorus redissolution.

In the processes developed so far for biological phosphorus elimination, these two factors have been taken into account in different ways. In the simplest process so far, the so-called A/O process, which, for example, is described in the study of Krichten, D. J., Hong, S. N., Tracy, K. D., Applied Biological Phosphorus Removal by the A/O Process, Internat. Conf. "Phosphorus in the Environment," Lisbon, July 1985, an unaerated thoroughly intermixed tank or tank cascade is connected upstream from the activated sludge tank. Return sludge and raw or presettled sewage enter into this tank, and sludge detention times in this tank are from 1 to 5 hours. Detention times in the subsequent activated sludge tank are about 2 to 5 hours. The use of this process is limited to sufficiently highly loaded plants, in which no nitrification (microbial oxidation of ammonia to nitrite and nitrate) occurs. This would result in the nitrite or nitrate with the return sludge entering the unaerated part of the plant and preventing phosphorus redissolution there.

In another process, the so-called "Phoredox" or modified Bardenpho process, as in the A/O process, return sludge and raw or presettled sewage first enters into an unaerated, thoroughly intermixed tank or into a tank cascade. But in the downstream stages, there are provided a nitrification stage and a complete denitrification stage (microbial reduction of nitrite and nitrate to molecular nitrogen, which escapes as gas from sewage), so that no nitrite or nitrate, with the return sludge, can enter the anaerobic phosphorous redissolution stage. Thus, this process is specially tailored for lightly loaded plants with biological nitrogen and phosphorus elimination. In this case, in the first unaerated, thoroughly intermixed tank serving for phosphorus redissolution, sludge detention times on an order of magnitude of 1.5 hours are obtained.

Another process is the so-called UCT (University of Cape Town) process, which is described, for example, in Ekama, G. A., Marais, G. R., Additional biological P elimination in the activated sludge process—Experiences in South Africa, GWF 126, pages 214 to 249 (1985). This process was developed to be able to avoid the high expenditure necessary for a complete denitrification. In this process, there is a deliberate limitation to an upstream denitrification, by means of which, for reasons of principle, a 100% nitrite or nitrate elimination can never be achieved. Since the return sludge thus contains nitrite and nitrate, it is first fed into a denitrification tank. From this tank the sludge is then fed into the upstream, unaerated mixing tank, which is to serve for phosphorus redissolution. There, as in the two first mentioned processes, the contact with raw or presettled sewage takes place with complete intermixing, and the sludge detention times are on an order of magnitude of 1.5 hours.

The three processes described so far are the three main biological processes for phosphorus elimination. Another process, the so-called Biodenipho process, basically does not differ from the processes already described as far as achievement of the phosphorus redissolution is concerned.

In comparison with the processes described so far, there are substantial differences in the so-called Phostrip process, which is described, for example, in Levin, G. V., Topol, G. J., Tarnay, A. G., Operation of Full Scale Biological Phosphorus Removal Plant, JWPCF 47, 577–590 (1975). This process represents a combination of the enhanced biological phosphorus elimination with a chemical precipitation process for phosphorus removal. In this process a part of the return sludge is fed into a settling tank described as "stripper." While the phosphate redissolution starts in this tank on the basis of an anaerobic detention time lasting several hours, at the same time the separation of a phosphate-containing supernatant takes place by a static thickening. This phosphate-containing supernatant water is then chemically precipitated.

Thus, in contrast with the other processes, in the Phostrip process, the objective is the elimination, by chemical sewage partial stream precipitation, of the portion of the phosphorus load which cannot be eliminated from the sewage by means of purely biological effects. The specific features of a precipitation with lime (Ca(OH)$_2$) call for the lime to be used much more economically in the sewage partial stream precipitation than in the precipitation from the total sewage stream.

In principle, the use of the Phostrip process is limited to nonnitrifying, that is, highly loaded activated sludge plants, since nitrite or nitrate can enter into the stripper with the return sludge. But corresponding countermeasures are possible and have already been achieved. The last named process was repeatedly modified, first, with the goal of "acceleration of the phosphorus redissolution in the stripper" (feeding of presettled sewage), but especially with the goal of "considerable conversion of phosphate in the stripper supernatant" (feeding of presettled sewage, purified sewage or chemically treated sewage, recycling of stripper sludge).

The efficiency of the purely biologically operating process for phosphorus elimination (A/O, Phoredox, UCT, Biodenipho) so far has proved to be inadequate in most cases. Because of the process requirements differing from one another, so far the results documented in the literature can hardly be compared with one another, and so far parallel studies are completely lacking. However, it can be stated that an overall phosphorus elimination of over 75% can be achieved only in very rare cases.

The substantially higher attainable elimination rates in the Phostrip process are to be attributed to the chemical partial stream precipitation. Also in this process the biological portion in the total elimination performance is limited to under 75%.

Possibly with the exception of the A/O process, all the processes described so far have the serious disadvantage of being highly complex, involving a high investment cost, and moreover, the operation can be maintained only with especially trained personnel.

SUMMARY OF THE INVENTION

An object of one aspect of this invention is to provide an improved process and a plant for achieving such a process, especially a process wherein the biological phosphorus elimination can be accomplished with at least a relatively reduced plant expenditure.

An object of another apsect of the invention is to provide an apparatus for such a process.

Upon further study of the specification and appended claims, further objects and advantages of this invention will become apparent to those skilled in the art.

As to the process aspect, there is proivded a process for purification of phosphate-containing sewage with biological phosphorus elimination, in which the settleable and/or nonsetteable sewage components are treated with activated sludge in successive treatment tanks first under anaerobic and then under aerobic conditions and in which an activated return sludge is fed back from the secondary settling tank into the stage operating under anaerobic conditions, characterized in that the treatment under anaerobic conditions takes place in a settling tank, in which the sludge detention period exceeds the hydraulic detention period.

As to the apparatus aspect, there is provided a plant for purification of phosphate-containing sewage with biological phosphorus elimination with a tank operating under anaerobic conditions, a downstream aerated activated sludge tank and a secondary settling tank, from which an excess sludge and a return sludge fed into the tank operating under anaerobic conditions are removed, characterized in that the tank operating under anaerobic conditions is a settling tank (1), which exhibits a feed pipe (4) for a mixture of return sludge and settleable and/or nonsettleable sewage components, a discharge pipe (5) for the overflow, which is connected to downstream aerated activated sludge tank (2), as well as a discharge pipe (6) for the thick sludge from the bottom of settling tank (1), which is also connected to downstream aerated activated sludge tank (2), and between settling tank (1) and aerated activated sludge tank (2) other treatment tanks are optionally connected, through which the overflow or the overflow and the thick sludge are passed before introduction into aerated activated sludge tank (2).

The process according to the invention is based on the inventor's knowledge—gained from many years of experience with semi-industrial scale plants, in which a biological phosphorus elimination was supposed to be achieved—that for an increase of the phosphorus elimination performance two conditions are particularly important:

1. The anaerobic detention time of the activated sludge must be considerably increased in comparison with the processes tried so far and 2. The total potential of the easily degradable substrate in the raw sewage must be made available to increase the phosphate redissolution rate during the anaerobic detention time.

As regards to the first named condition, it has been discovered that in a contact of sewage and return sludge in the thoroughly intermixed tank provided so far for this purpose the anaerobic sludge detention times are always too short. Since the size of the tank cannot arbitrarily be increased, a method was followed according to the present invention to decouple the sludge detention time from the hydraulic detention time, which could be achieved in the simplest way in a settling tank in which the sludge settles after contact with the sewage. Only the amount of thickened sludge, which necessarily results from the solids balance, is removed from the bottom of the settling tank. With a good thickening, very high sludge detention times can be achieved, which can be in the range of 5 to 30 hours or more.

Preferably, the sludge detention time is over 6, more preferably over 7, still more preferably over 8, particularly preferably over 9, and especially preferably over 10 hours. Especially advantageous is the range of 10 to 24 hours.

To be able to follow the second of the above-mentioned conditions in a desired way, it has proved especially suitable for the return sludge to be brought into contact with raw sewage at the head of the anaerobic phosphorous redissolution tank. More advantageously, the primary settling generally provided until now can be dispensed with, and the primary settling tank available in most cases in a sewage treatment plant can be converted to an anaerobic phosphate redissolving tank, in which the first stage of the process according to the invention is performed.

In the context of this invention, raw sewage means town, city, trade or industrial sewage, which optionally has been pretreated in a screen, sand and/or fat trap stage but has not been subjected to any presettling and thus exhibits a high proportion of settleable materials.

The process according to the invention is distinguished by a great simplicity and by the possibility of equipping existing sewage treatment plants without substantial reconstruction measures for an extensive biological phosphorus elimination. In a test operation of over two months, it already proved its superiority in comparison with existing processes. With the usual concentrations of phosphorus in raw sewage of an average of 8 mg/l of total phosphorus, discharge values on average of less than 1 mg/l of total phosphorus could be maintained and a phosphorus elimination of almost 90% was calculated. The elimination performance was even considerably higher relative to phosphate. In the process, phosphate is practically completely absorbed by the activated sludge. The residual contents of phosphorus in the discharge were to be ascribed mainly to particulate phosphorus.

Without being bound by an explanation or theory of the invention, the following theoretical background of the invention is provided.

It is known that presettled sludge, which is exposed for some time to anaerobic conditions, changes into the so-called acid fermentation. As a result, fats, sugars and other degradable substances are degraded to lower organic fatty acids, especially acetate, by some of the microorganisms contained in the presettled sludge. Since organic acids result as degradation products, this process is also described as acidogenesis. These degradation products are separated out. These materials are subjected to another degradation only if as a result of a very long detention time (several days to weeks), the so-called methane fermentation starts.

It was determined in preliminary tests that the addition of the so-called degradation products to return sludge causes a considerable acceleration of the phosphorus redissolution in the corresponding section of the plant. For both processes, phosphate release from return sludge and release of organic acids from presettled sludge, identical milieu conditions are required, namely anaerobic conditions. Thus, it was conceived by the inventor that it could be advantageous to combine both processes in one reactor. Precisely this happens in the settling tank, in which the first stage of the process according to the invention is performed and it can thus be described as an integrated fermentation and phosphate redissolving tank. The fresh presettled sludge thickens together with the return sludge under anaerobic conditions, organic acids are released and are directly available for the return sludge. The organic fatty acids are absorbed by the return sludge, and in correlation with this, a release of phosphate can be established. Because of the optimal conditions created, the phosphate release occurs exceptionally intensively, which considering the introductory explanations leads to the fact that phosphate absorption is also optimal in the activated sludge tank.

The usability of the process is not limited to the highly loaded plants without nitrification. The reductive potential in the anaerobic settling tank is so great that return sludge denitrification can take place, without the phosphate redissolution capacity being substantially adversely affected. In contrast with the known processes, in which the operation is performed with totally intermixed tanks, in which the nitrate, carried in with the return sludge, is immediately distributed over all areas of the tank and everywhere prevents phosphate redissolution, in the settling tank of the process according to the invention, the nitrate, coming from the return sludge, on its introduction together with the raw sewage gets only to the topmost zone of the tank, where it is quickly reduced. Thus an inhibition of the phosphate redissolution in the lower zones is excluded. Only the fact that in the nitrate reduction, easy degradable substrate is used, somewhat reduces the extent of the phosphate redissolution. But since the easily degradable substrate, dissolved in the raw sewage, is completely sufficient for the nitrate reduction, the organic acids, released in the fermentation, are completely available for the phosphate redissolution.

Thus a stable phosphorus elimination is guaranteed also in sewage treatment plants that are in the critical load range and nitrify only at times. Moreover, the process according to the invention can easily be combined with an extensive nitrogen elimination, whether by means of upstream denitrification, simultaneous denitrification or alternating operation (Biodenitro process). In principle, a combination is possible with any process in which a mobile activated sludge, not fixed on a support bed, exists.

If necessary, the thick sludge, removed from the anaerobically operated settling tank, can also be subjected to an additional anaerobic detention time. This can take place in another settling tank or a mixing tank. Such a measure may be necessary especially if the thickening of the mixed sludge in the anaerobic settling tank because of high hydraulic load is not extensive enough for an adequate anaerobic detention time of the sludge to be achieved.

In a further development of the idea of the invention only the settleable sewage components are fed to the settling tank kept under anaerobic conditions, while the nonsettleable sewage components are fed directly into the treatment tank kept under aerobic conditions.

For this purpose, upstream from the anaerobically operating settling tank is suitably connected a primary settling tank, in which the settleable sewage components, i.e., sewage sludge, and the nonsettleable sewage components, i.e., presettled sewage, are separated from one another. By this variant of the process the anaerobically operated settling tank has a lower hydraulic load, better sludge thickening is obtained concomitant with results a higher sludge detention time. However, a disadvantage is that the dissolved sewage components cannot become effective for an intensification of the phosphorus redissolution in the anaerobic stage, since presettled sewage is fed directly into the aerobic treatment stage. On the other hand, by an increased anaerobic detention time of the sludge a greater phosphorus redissolution and thus also a greater phosphorus absorption in the activated sludge tank takes place. The phosphorus elimination performance is improved.

The sewage sludge could additionally be subjected to a treatment which is suitable for separating the coarse solids from the fine solids. For this purpose, for example, a centrifuge can be used. The sludge, centrifuged off, which contains the coarse solids and precipitates in greatly thickened form, can be fed directly to the sludge treatment. The centrifugate liquid suspension having a high portion of fine solids, is fed into the anaerobic settling tank.

Another process variant of the process according to the invention provides for feeding only the nonsettleable sewage components to the anaerobically operated settling tank, while the settleable sewage components are removed. The separation of the settleable sewage components, i.e., sewage sludge, underneath nonsettleable sewage components, i.e., presettled sewage or wastewater, again takes place in an upstream primary settling tank. With this charging of the anaerobically operating settling tank with presettled wastewater, it is not the decomposition of the particulate substrate that stands out but instead the increased anaerobic sludge detention time in comparison with totally intermixed systems. By this process embodiment, there are avoided possible negative effects of dispensing with the primary settling stage, such as increased oxygen demand, deposits, cloggings, etc.

In the case of unfavorable sewage composition (high phosphate concentrations, low BOD concentrations) the process variants described so far can reach their performance limits. In this case, it is provided according to the invention, by means of a sewage partial stream precipitation, chemically to bind a high phosphate load with the least use of lime. For this purpose, the sludge, removed from the aerobically operated settling tank, is separated into phosphate-rich water and phosphate-poor sludge, e.g., by means of a centrifuge. The phosphate-rich water is subjected to a lime precipitation at a pH of about 9, and the resulting precipitated sludge is removed and the supernatant water is fed to the treatment tank kept under aerobic conditions. The phosphate-poor sludge is fed directly to the treatment tank kept under aerobic conditions. By the small amount of the sewage partial stream of sewage and the high dissolved phosphate concentrations, ideal conditions are provided for phosphate precipitation. The removed calcium phosphate precipitated sludge can be fed to further use.

According to the invention, it is also provided to subject to a lime precipitation the thick sludge removed from the anaerobically operated settling tank. The resulting precipitated sludge, with a pH of about 9, together with the organic sludge gets into the aerobically operated treatment tank, and there, because of the adjusting pH reduction, is again brought partially into solution. But a more or less large part of the precipitated sludge is left in solid form because of the so-called "ag- ing" of the calcium phosphate crystals and leaves the system with the excess sludge. Thus to the biologically bound phosphate is added a chemically bound portion, as a result of which the efficiency of elimination is increased.

The fact that in the basic process, a principle of the invention is that a high concentration of phosphate can be attained in a small quantity of a plant partial stream, e.g., a small volume of sewage sludge, this aspect of the process variant is used in the partial stream precipitation with lime. In the precipitation with lime, the efficiency of the phosphorus elimination depends on the attainable raising of the pH. Thus concentration of the phosphate in a small sewage partial stream amount means that here some efficiency can be achieved with the use of a great deal less lime than in the precipitation of the total sewage amount. Saving of lime is thus directly proportional to the ratio of sewage partial stream amount to total sewage amount.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 7 is a flow chart, which describes the operating method of a pilot plant in test phases 1a and 1b of the test described in the example;

FIG. 8 is a flow chart, which describes the operating method of a pilot plant in test phase 2 of the test described in the example;

DETAILED DESCRIPTION OF THE DRAWINGS

Figure 1:
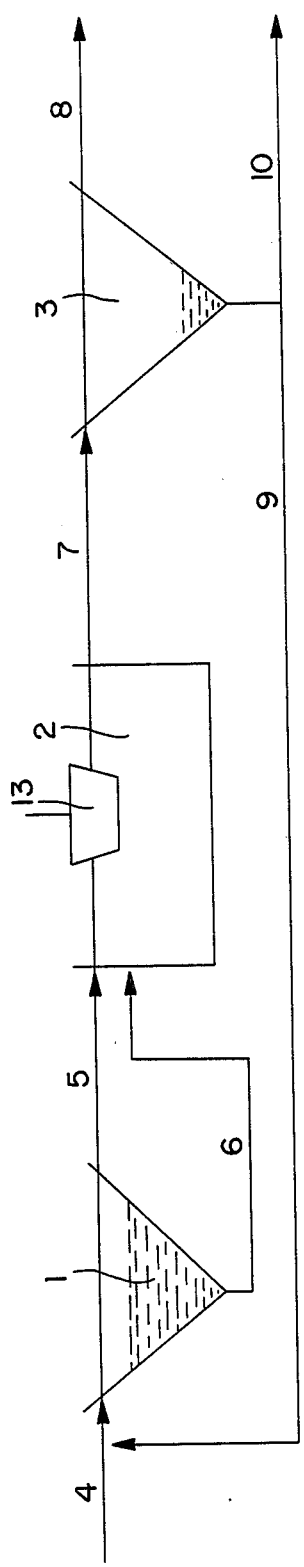
FIG. 1 is a schematic flow chart of the process according to the invention.

Referring to FIG. 1, a plant according to the invention comprises three interconnected plant parts, which correspond to three process stages. They are a settling tank 1, an activated sludge tank 2 and a secondary settling tank 3. To settling tank 1 is fed, by a pipe 4, raw sewage with which return sludge from settling tank 3 is mixed at the head of settling tank 1, by a pipe 9. Thus feed pipe 4 empties in the area of the liquid surface in the settling tank, so that settleable solid particles can sink downward unhindered and in the area, in which a still relatively fresh mixture of raw sewage and return sludge is present, a denitrification can take place which prevents the nitrate components from getting into the settled thick sludge. By a pipe 5, the overflow of settling tank 1 is fed directly or, as will be described, by other inserted anaerobic stages, to activated sludge tank 2, to which also at the same time thick sludge from the bottom of the settling tank is fed by a pipe 6. Activated sludge tank 2 is any known suitable activated sludge tank, which can be aerated from the surface (e.g. with aerators 13) or by means of other devices known in the art for aeration or gassing with air or pure oxygen. Activated sludge tank 2 is connected in the usual way by pipe 7 to secondary settling tank 3, from which in the usual way the clarified sewage flows out by pipe 8, while from the bottom a biological sludge is removed, which is divided into a return sludge fed back by pipe 9 and an excess sludge removed by pipe 10. But unlike what is represented in FIG. 1, the excess sludge can also be removed directly from activated sludge tank 2, which could have the advantage that the phosphorus content of the excess sludge cannot be reduced by a phosphorus redissolution starting in the secondary settling tank. A removal of excess sludge from the settling tank is less preferred but can also be useful in individual cases. Settling tank 1 guarantees that sludge detention times are obtained, which are longer than the hydraulic detention times so that an intensive phosphate redissolution is obtained, which is a requirement for an effective phosphate absorption in the subsequent activated sludge tank.

Settling tank 1 in this case can be a standard primary settling tank present in most sewage treatment plants, which by appropriate modification, i.e., by adaptation of the different feed and discharge pipes, was converted into an anaerobic settling tank for the present process. The advantages of such a process according to the invention in essence are described supra.

FIGS. 2–6 show preferred embodiments of the invention, in which the same reference numbers have the same meaning as in FIG. 1.

Figure 2:
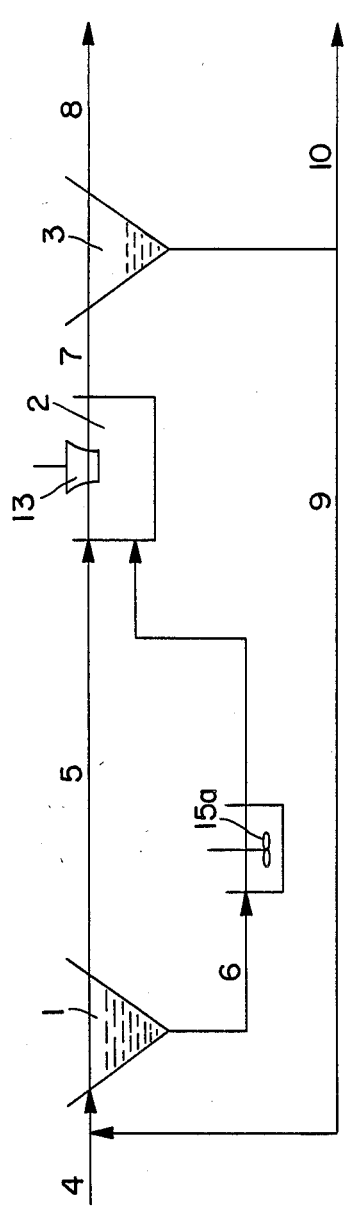
FIG. 2 is a flow chart, which, in addition to the components ddepicted in FIG. 1, comprises a mixing tank for extending the anaerobic detention time.

FIG. 2 shows a plant according to the invention, which, in addition to the basic elements essential to the invention, comprises a mixing tank for extending the anaerobic detention time. Discharge pipe 6 for thick sludge from the bottom of anaerobic settling tank 1 is connected to a mixing tank 15a, which also is operated under anaerobic conditions. The sludge thus treated is finally fed to aerated activated sludge tank 2. An additional anaerobic detention time is necessary if the thickening of the mixed sludge in anaerobic settling tank 1 is not extensive enough because of prehydraulic load.

Figure 3:
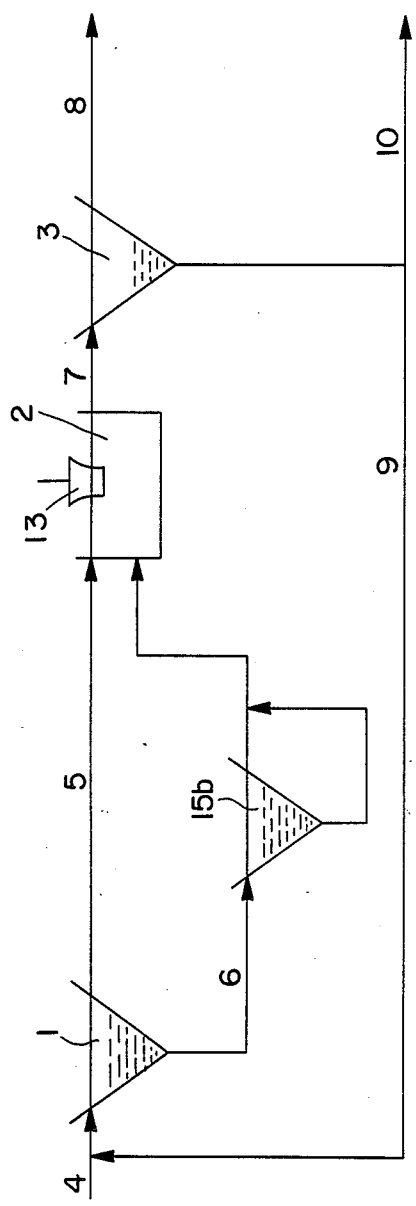
FIG. 3 is a flow chart, which, in addition to the components of FIG. 1, comprises an additional settling tank for extending the anaerobic detention time.

Another possibility of extending the anaerobic detention time is shown in FIG. 3 where mixing tank 15a of FIG. 2 is replaced by a second anaerobically operated settling tank 15b.

Figure 4:
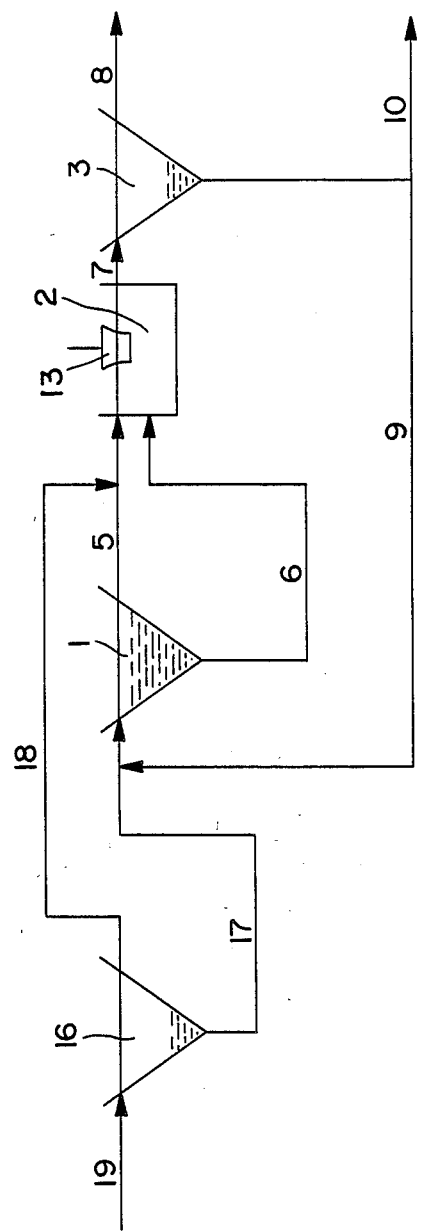
FIG. 4 is a flow chart, which illustrates the operating method wherein the anaerobic settling tank according to the invention is charged with pre-separated sewage sludge.

FIG. 4 shows a plant according to the invention charged with sewage sludge. Upstream from anaerobic settling tank 1 is connected a primary settling tank 16, to which raw sewage is fed by pipe 19. The raw sewage is separated into sewage sludge and presettled sewage in primary settling tank 16. The sewage sludge is fed by pipe 17 to anaerobically operated settling tank 1 together with return sludge fed by pipe 9. On the other hand, the presettled sewage is fed by pipe 18 directly to aerated activated sludge tank 2. As was already explained above, this method offers the advantage that anaerobically operated settling tank 1 has a lower hydraulic load.

Figure 5:
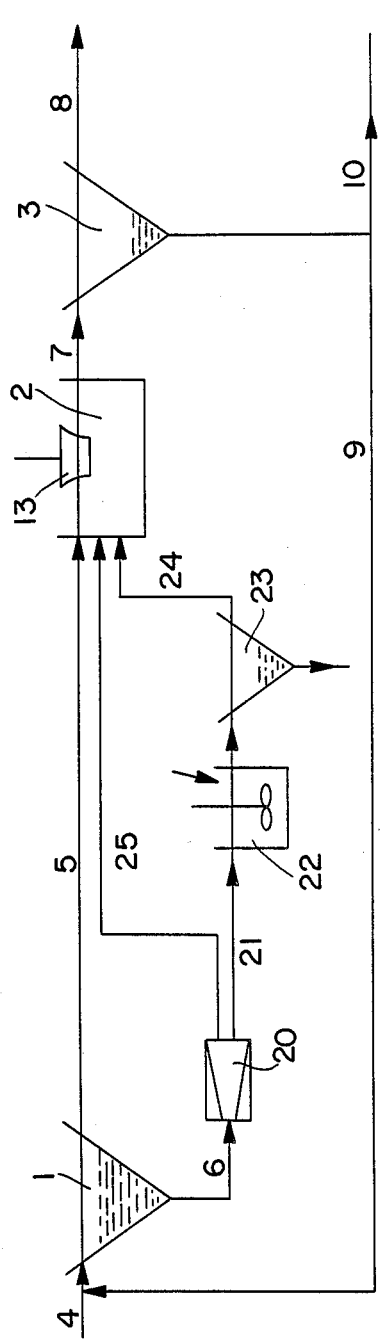
FIG. 5 is a flow chart, which describes the operating method of the plant according to the invention with sewage partial stream precipitation and separate precipitated sludge removal.
Figure 6:
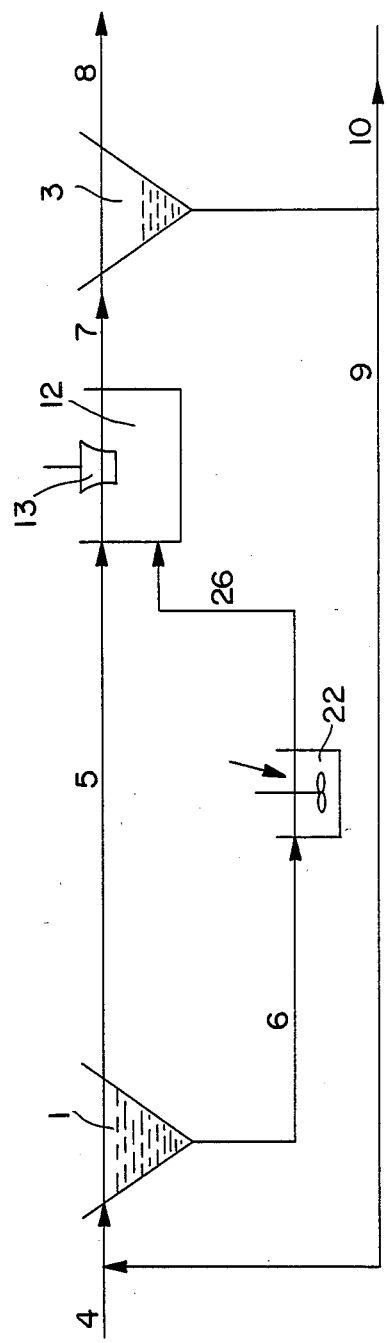
FIG. 6 is a flow chart, which describes the operating method of the invention with sewage partial stream precipitation without separate precipitated sludge removal.

FIGS. 5 and 6 show the operation of the plant according to the invention with sewage partial stream precipitation.

In the plant described in FIG. 5 the thick sludge removed by pipe 6 from anaerobically operated settling tank 1 is fed to a centrifuge 20, where it is separated into phosphate-rich water and phosphate-poor sludge. The phosphate-rich water is fed by pipe 21 into a mixing tank 22, to which lime is added. The resulting precipitated sludge is removed in a subsequent settling tank 23, while the supernatant water is fed by pipe 24 into aerated activated sludge tank 2. On the other hand, the phosphate-poor sludge is fed directly by pipe 25 into activated sludge tank 2. As already explained in detail above, this process variant according to the invention makes possible an elimination of high phosphate loads with the least use of lime.

FIG. 6 shows another possibility of the partial stream precipitation. The thick sludge, removed from settling tank 1 by pipe 6, is subjected directly to a lime precipitation in mixing tank 22. The resulting precipitated sludge, together with organic sewage, gets to activated sludge tank 2 by pipe 26. A large part of the precipitated sludge remains in activated sludge tank 2 in solid form and leaves the plant with excess sludge by pipe 10.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

In the following test example; and in FIGS. 7 and 8 describing a pilot plant, the same references have the same meaning as in FIG. 1.

EXAMPLE

This example describes a three-month test operation on semi-industrial scale.

Method of Operation of the Pilot Plant

Activated sludge tank 2 of the pilot plant was operated with pure oxygen aeration because of the preexisting plant parts. In the activated sludge tank of the pilot plant there was involved a three-cascade with 1.7 m$^3$ total content in closed design with surface aerators 13 and an oxygen feed into the gas space of first cascade tank 12a. The gas spaces of individual cascade chambers 12a, b, c are connected to one another by means of hoses. The waste gas, which consists especially of $CO_2$ and residual oxygen, leaves the activated sludge tank by the third cascade chamber 12c.

The tests were performed in August to November in two parts.

In the first test part, the activation was operated with an upstream denitrification (cf. FIG. 7), by connecting upstream from activated sludge tank 2 a thoroughly mixed denitrification chamber 11, to which was fed a partial stream of the discharge from activated sludge tank 2, together with the overflow and the thick sludge from settling tank 1.

In the second test part, such a specific denitrification was dispensed with to observe the effects of a nitrate-containing return sludge on the phosphate redissolution in the anaerobic settling tank (FIG. 8).

The operation data of both test parts are provided in table 1.

TABLE I

| Operation data of the pilot plant | | |
|---|---|---|
| Volume of settling tank | $m^3$ | 2.0 |
| Volume of denitrification tank (only in test phase 1) | $m^3$ | 1.0 |
| Volume of activated sludge tank | $m^3$ | 1.7 |
| Volume of secondary settling tank | $m^3$ | 2.0 |
| Sewage amount (raw sewage) | $m^3/h$ | 0.30 |
| Return sludge - amount | $m^3/h$ | 0.09 |
| Overflow amount | $m^3/h$ | 0.33 |
| Thick sludge - amount | $m^3/h$ | 0.06 |
| Circulating duct (only in test phase 1) | $m^3/h$ | 0.60 |

Determination of the total phosphorus, $BOD_5$, COD and solids in the feed and discharge of the pilot plant took place from 24-hour composite samples. Taking of the 24-hour composite samples was maintained over the entire test period. Determination of the total phosphorus basically was made from each daily composite sample. The phosphorus content of the excess sludge was continuously recorded to be able to perform as exact a phosphorus balancing as possible.

The orthophosphate concentration was determined only from random samples. $BOD_5$, COD, filterable materials and all nitrogen parameters were determined from daily composite samples but not every day.

The analysis took place in all cases according to the German Standard Methods (DEV). In regard to phosphorus, decomposition with sulfuric acid/perchloric acid was used.

Operating Results

Figure 10:
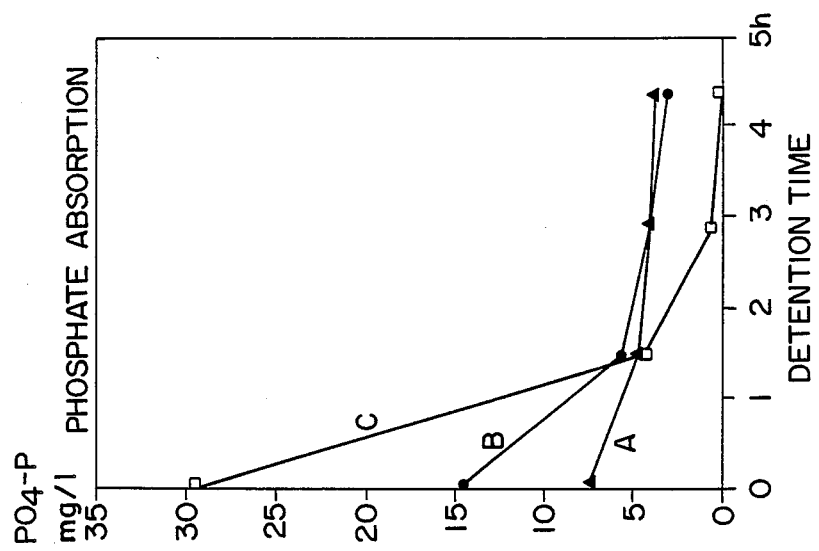
FIG. 10 is a diagram, which shows the course of phosphate absorption in the activated sludge tank cascade in the first weeks after starting of the pilot plant of the example.
Figure 9:
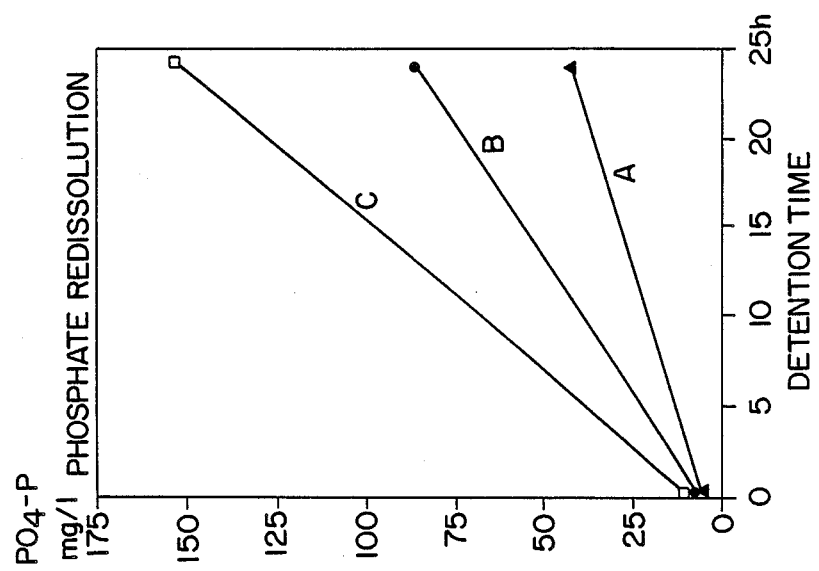
FIG. 9 is a diagram, which shows the course of phosphate redissolution in the anaerobic settling tank in the first weeks after starting of the pilot plant of the example.
Figure 11:
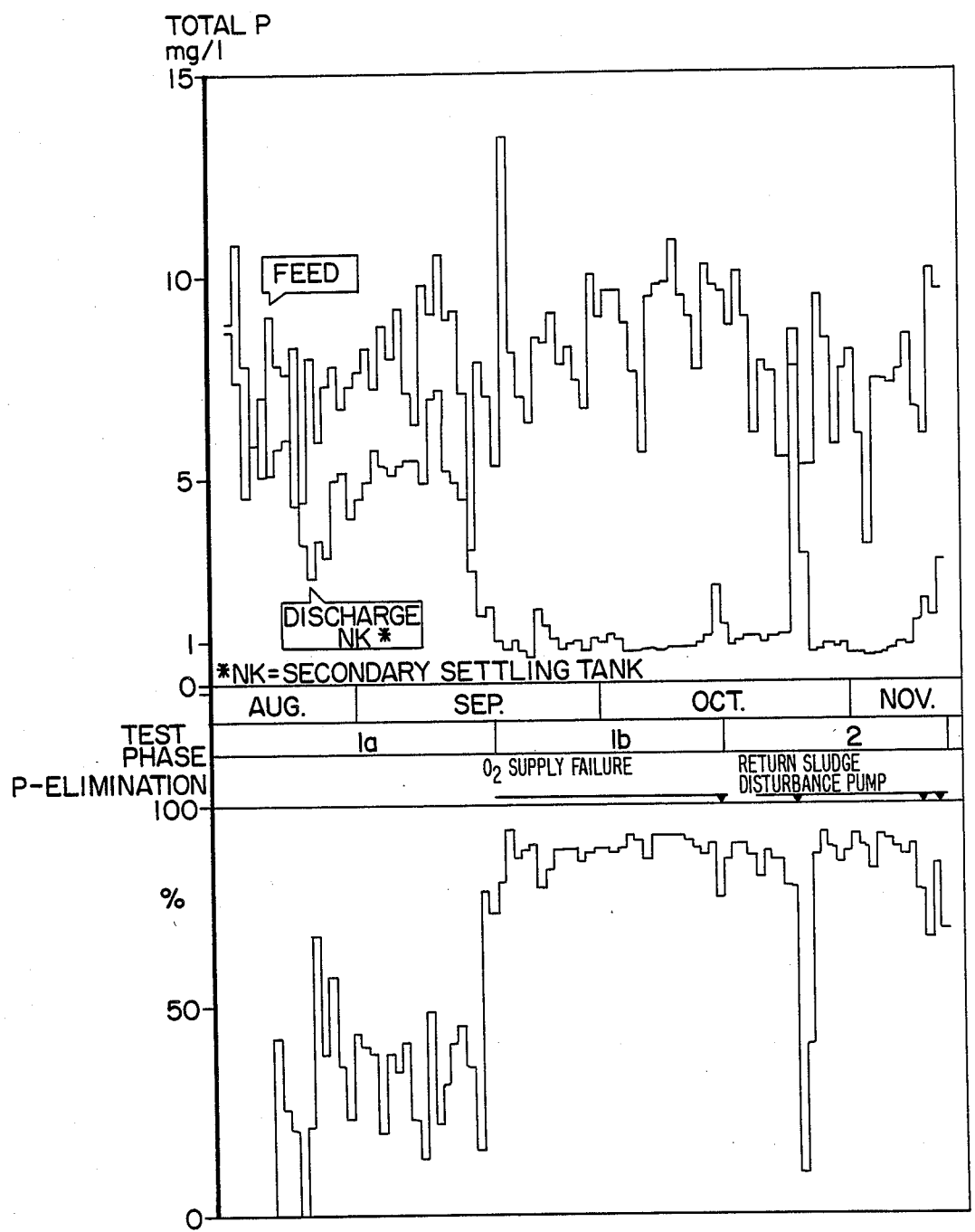
FIG. 11 is a diagram which illustrates the entire phosphorus concentrations in the feed and discharge of the pilot plant and the resulting phosphorus elimination in the example, in which the measurement data are reported from 24 hour composite samples.

The results achieved can best be described by the diagrams in FIG. 11, which reproduce the total phosphorus concentrations in the feed and discharge of the pilot plant and the resulting phosphorus elimination. It is recognized that a start-up phase of over 4 weeks was necessary until a phosphorus elimination performance of over 80% could be recorded. In examining the elimination performance, the increase toward the end of the four-week start-up phase seems to be exponential. It can be recognized from FIG. 9, which shows the phosphorus redissolution in the anaerobic tank, that the total process at least relative to phosphorus redissolution during the start-up phase experiences a relatively continuous change. On the other hand, FIG. 10 shows the phosphorus absorption in the activated sludge tank cascade, in which curves A, B and C respectively describe the conditions 10, 18 and 39 days after the beginning of the operation. In this connection, curve C at the same time represents the equilibrium state reached.

It can clearly be recognized that an increased phosphate redissolution in the anaerobic settling tank contrasts with an increasing phosphate absorption in the activated sludge tank. However, to start with the net elimination is held within bounds, i.e., there is only a slight additional absorption of phosphate in comparison with the previous phosphate redissolution. However, this overcompensation of the phosphate redissolution, previously obtained in each case, greatly increases in the fourth test week and from about the 30th test day leads to a practically complete phosphate absorption in the activated sludge tank.

Since all measurement results indicate that from this day an equilibrium state was reached, the results documented in following table 2 relate to the period from the 32nd test day to the end of the studies. Days, on which a reduced elimination performance was clearly to be ascribed to technical difficulties (breakdown of oxygen supply, breakdown of return sludge pump) are not considered in forming the averages.

TABLE 2

Operating results of the pilot plant in test phase 1b and test phase 2 24-hour composite samples, averages

| Parameter | Measuring point | Dim. | Test phase 1b | Test phase 2 |
|---|---|---|---|---|
| Total phosphorus tot P | raw sewage | $g/m^3$ | 8.40 | 7.47 |
| | discharge | $g/m^3$ | 0.95 | 0.90 |
| | elimination | % | 89 | 88 |
| Biological oxygen demand $BOD_5$ | raw sewage | $g/m^3$ | 158 | 157 |
| | discharge | $g/m^3$ | 7 | 7 |
| | elimination | % | 96 | 96 |
| Chemical oxygen demand COD | raw sewage | $g/m^3$ | 327 | 303 |
| | discharge | $g/m^3$ | 53 | 39 |
| | elimination | % | 84 | 87 |
| solids DS | raw sewage | $g/m^3$ | 135 | 101 |
| | overflow | $g/m^3$ | 147 | 74 |
| | discharge | $g/m^3$ | 18 | 10 |
| | return sludge | $g/m^3$ | 19,300 | 18,300 |
| | thick sludge | $g/m^3$ | 28,800 | 27,300 |
| | activated sludge | $g/m^3$ | 5,340 | 5,140 |
| Sludge volume index SVI | activated sludge | $cm^3/g$ | 78 | 85 |
| Space loading $L_S$ | | $kg/m^3 d$ | 0.67 | 0.66 |
| Sludge loading $L_{DS}$ | | kg/kg d | 0.12 | 0.13 |

As Table 2 shows, the documented period of study is subdivided into two test phases of 28-day periods each (phase 1b and 2, corresponding to FIG. 7 and 8). As can be gathered from Table 2, a long-range average of less than 1 mg/l of total phosphorus in the discharge in the pilot plant was maintained. The resulting elimination performance was close to 90%.

Also the COD and $BOD_5$ elimination is very good. Thus, the degradation performance was in no way adversely affected by the long anaerobic detention time of the return sludge in the upstream settling tank (about 24 hours). Said sludge detention time results in this case from the removed thick sludge and the volume of the sludge zone in the settling tank (about 1.5 $m^3$).

Because of the excellent settling properties of the activated sludge (SVI about 80), high solid concentrations could be attained in the activated sludge tank. Despite the relatively low sludge loading, the nitrification remains incomplete over the entire period of study.

On the average, only a 40% ammonia elimination could be noted, the nitrate values of the discharge remain limited to the range of 10 mg/l of $NO_3$ nitrogen. Probably no influences ascribable to the features of the process according to the invention are to be held responsible for the inhibition of the nitrification, but rather the oxygen aeration technique used in the pilot plant which results in a accumulation of $CO_2$. The low pH in the activated sludge tank of 6.5 and the feed acid capacity of only 5 mmol/l indicate that in this critical load range in the case of oxygen aeration of plants, an inhibition of the nitrification can occur.

Because of the limited nitrification, nitrite or nitrate could never be detected in the return sludge in test phase 2 (without upstream denitrification).

Studies, which should give an explanation of the make-up of the residual phosphorus content of the discharge provided data in Table 3. Table 3 contains average values of random sample studies of the discharge and of the activated sludge of 3rd cascade chamber 12c. Only 0.15 mg/l of $PO_4$ phosphorus can then be detected in the filtered sample from the 3rd cascade chamber. Orthophosphate is thus practically completely absorbed by the activated sludge. On the other hand, 0.23 mg/l of $PO_4$ phosphorus can be detected in discharge 8, and the small increase in comparison with activated sludge tank discharge 7 is to be ascribed to a beginning phosphate redissolution in secondary settling tank 3. In connection with the also documented total phosphorus contents of the original and filtered discharge samples, a picture is produced that the total phosphorus contents of the discharge consists of approximately equal parts of orthophosphate phosphorus, filterable phosphorus compounds and unfilterable phosphorus compounds (without orthophosphate). Of these components the last named is the hardest to detect; the others could be reduced still further by a further improved process technique (e.g., sewage filtration or also flocculation filtration).

A sewage sludge from conventional sewage treatment plants exhibits phosphorus contents of 1 to 2% by weight. Usual phosphorus elimination rates of about 20% correlate with this. An increased phosphorus elimination in the case of the pilot plant must contrast with an increased phosphorus content of the excess sludge. Determination of the phosphorus content of the excess sludge resulted in a value on the average of 4.0% by weight of phosphorus, relative to the dry substance, or 5.5% by weight of phosphorus, relative to the organic dry substance.

If a tolerance range of 10% is assumed on the basis of possible sources of error, the value obtained with the phosphorus content of the excess sludge correlates quite accurately with the observed phosphorus elimination. The corresponding data are provided in table 4.

In this connection it is to be pointed out that in the process according to the invention the specific excess sludge production, because of the absent presettling, turns out to be comparatively great, which, from basic considerations, as stated supra is advantageous for a high phosphorus elimination.

The three-month test operation of the pilot plant on a semi-industrial scale thus shows that, after a one-month start-up phase, a total phosphorus elimination of over 80% can be stably obtained. As a long-term average, a total phosphorus elimination of barely 90% was detected, with discharge concentration of an average of 0.93 mg of total phosphorus/l and 0.23 mg of $PO_4$ phosphorus/l.

The process according to the invention can be placed into practice without a great investment expenditures. In the case of existing sewage treatment plants, the process elements of primary settling tanks, activated sludge tanks and secondary settling tanks can be remodeled with slight expenditures so that an extensive biological phosphorus elimination is achieved according to the process according to the invention.

TABLE 3

Total phosphorus and orthophosphate phosphorus in discharge and activated sludge random samples Average values of the measurement data from the period after the end of the start-up phase of the pilot plant

| Parameter | Sample | Dim. | Test Phase 1b + 2 |
|---|---|---|---|
| Total phosphorus | discharge, unfilt. | $g/m^3$ | 0.75 |
| Tot. P | discharge, filtd.° | $g/m^3$ | 0.47 |
| Orthophosphate phosphorus | discharge, filtd.° | $g/m^3$ | 0.23 |
| $PO_4$ P | activated sludge chamber 3, filtd.° | $g/m^3$ | 0.15 |

°membrane filter, pore diameter 0.45 micron

TABLE 4

Phosphorus balance of pilot plant, based on the measurement data from the period after the end of the start-up phase of the pilot plant

| Eliminated phosphorus amount | g P per $m^3$ sewage | 7.0 |
|---|---|---|
| Phosphorus content of excess sludge | g P per g DS | 0.04 |
| Precipitating excess sludge amount* | g DS per $m^3$ sewage | 160 |

*corresponds to a specific excess sludge production of 1.0 kg excess sludge/kg $BOD_5$ The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The terms "hydraulic detention period" and "sludge detention period" in the claims are defined as follows:

The "hydraulic detection period" is defined as the total volume of the tank divided by the total hourly throughput.

The "sludge detention period" is the total volume of the tank divided by the hourly rate of sludge removal (discounting any residual sludge in the clarified overhead).

I claim:

1. In a process for the purification of phosphate-containing sewage with biological phosphorus elimination, in which the settleable and/or nonsettleable seewage components are treated with activated sludge in successive treatment tanks first under anaerobic and then under aerobic conditions and in which an activated return sludge is fed back from an aerobic stage comprising an aerated activated sludge tank and a secondary settling tank into the tank operating under anaerobic conditions, the improvement comprising conducting the treatment under anaerobic conditions in a settling tank, in which the sludge detention period exceeds the hydraulic detention period.

2. A process according to claim 1, wherein downstream from a settling tank maintained under anaerobic conditions is connected said aerated activated sludge tank and further comprising feeding to said aerated tank both an overflow from the settling tank and a thick sludge removed from the bottom of the settling tank.

3. A process according to claim 2, wherein the thick sludge, fed to the treatment tank kept under aerobic conditions, is removed from said settling tank maintained under anaerobic conditions in an amount, which corresponds to the combined solid load per unit of time consisting of raw sewage and return sludge.

4. A process according to claim 2, wherein the thick sludge, removed from the settling tank kept under anaerobic conditions, is separated into phosphate-rich water and phosphate-poor sludge, the phosphate-rich water is subjected to a lime precipitation, and precipitating sludge and supernatant water are fed to the treatment tank kept under aerobic conditions, while the phosphate-poor sludge is fed directly to the treatment tank kept under aerobic conditions.

5. A process according to claim 4, wherein the separation of the thick sludge into phosphate-rich water and phosphate-poor sludge is conducted by centrifuging.

6. A process according to claim 1, comprising mixing raw sewage, containing settleable materials, with the return sludge, and feeding the resultant mixture to said settling tank maintained under anaerobic conditions.

7. A process according to claim 6, wherein said mixture of raw sewage and return sludge is introduced into an area of the surface of the settling tank maintained under anaerobic conditions.

8. A process according to claim 1, wherein only settleable sewage components are fed to the settling tank maintained under anaerobic conditions, while nonsettleable sewage components are fed directly into the treatment tank kept under aerobic conditions.

9. A process according to claim 8, wherein the sewage is separated in an upstream primary settling tank into sewage sludge, and into presettled sewage.

10. A process according to claim 1, wherein only nonsettleable sewage components are fed to the settling tank kept under anaerobic conditions, while said aerobic settling tank is bypassed by the settleable sewage components.

11. A process according to claim 1, further comprising removing thick sludge from the settling tank maintained under anaerobic conditions and subjecting resultant removed sludge to a lime precipitation step before introduction of the sludge into the treatment tank kept under aerobic conditions.

12. A process according to claim 1, wherein directly downstream from the aerated activated sludge tank is connected the secondary settling tank from which the activated sludge is removed in the form of return sludge and an excess sludge is removed.

13. A process according to claim 1, further integrated into an overall process with upstream denitrification, simultaneous denitrification or with alternating operation.

14. A process as defined by claim 1, wherein the sludge detention period exceeds 10 hours.

* * * * *